United States Patent
Chamberlin et al.

(10) Patent No.: US 9,130,430 B2
(45) Date of Patent: Sep. 8, 2015

(54) ELECTRIC MACHINE WITH FULLY ENCLOSED IN-SLOT CONDUCTORS

(75) Inventors: Bradley D. Chamberlin, Pendleton, IN (US); Koon Hoong Wan, Indianapolis, IN (US); Alex Creviston, Muncie, IN (US)

(73) Assignee: Remy Technologies LLC, Pendleton, IN (US)

(*) Notice: Subject to any disclaimer, the term of this patent is extended or adjusted under 35 U.S.C. 154(b) by 267 days.

(21) Appl. No.: 13/051,931

(22) Filed: Mar. 18, 2011

(65) Prior Publication Data

US 2012/0238142 A1 Sep. 20, 2012

(51) Int. Cl.
*H02K 3/34* (2006.01)
*H02K 15/02* (2006.01)
*H02K 15/00* (2006.01)

(52) U.S. Cl.
CPC .............. *H02K 3/34* (2013.01); *H02K 3/345* (2013.01); *H02K 15/0018* (2013.01); *Y10T 29/49009* (2015.01)

(58) Field of Classification Search
CPC ................................ H02K 3/34; H02K 3/345
USPC .................................................. 310/214, 215
IPC ........................................................ H02K 3/34
See application file for complete search history.

(56) References Cited

U.S. PATENT DOCUMENTS

| 3,122,667 | A | 2/1964 | Baciu |
| 4,090,290 | A | 5/1978 | Clark |
| 4,160,926 | A * | 7/1979 | Cope et al. ............. 310/215 |
| 4,602,180 | A * | 7/1986 | Olson .................... 310/215 |
| 5,721,397 | A | 2/1998 | Weinberg |
| 5,763,978 | A * | 6/1998 | Uchida et al. ........... 310/215 |
| 5,845,389 | A * | 12/1998 | Roberts et al. ............. 29/596 |
| 5,998,903 | A * | 12/1999 | Umeda et al. ........... 310/179 |
| 6,147,430 | A | 11/2000 | Kusase et al. |
| 6,147,432 | A | 11/2000 | Kusase et al. |
| 6,181,045 | B1 * | 1/2001 | Umeda et al. ........... 310/201 |
| 6,242,836 | B1 * | 6/2001 | Ishida et al. ........... 310/215 |
| 6,333,573 | B1 | 12/2001 | Nakamura |
| 6,335,583 | B1 | 1/2002 | Kusase et al. |
| 6,566,780 | B2 * | 5/2003 | Niimi et al. ........... 310/215 |
| 6,844,648 | B2 | 1/2005 | Luttrell et al. |
| 6,969,940 | B2 * | 11/2005 | Dalrymple et al. ...... 310/215 |
| 7,132,776 | B2 | 11/2006 | Tagami et al. |
| 7,183,678 | B2 * | 2/2007 | Sivasubramaniam et al. .. 310/64 |

(Continued)

OTHER PUBLICATIONS

Bhatia, A., "Aramid papers with improved dimensional stability," Electrical Electronics Insulation Conference, 1995, and Electrical Manufacturing & Coil Winding Conference. Proceedings, vol., No., pp. 409,410, Sep. 18-21, 1995.*

(Continued)

*Primary Examiner* — Thomas Truong
(74) *Attorney, Agent, or Firm* — Maginot, Moore & Beck LLP

(57) ABSTRACT

An electric machine includes a core with a plurality of slots. A plurality of electric conductors are positioned in the slots. Each of the plurality of electric conductors includes a U-turn portion extending between two in-slot portions and connection ends extending from the in-slot portions. The connection ends are positioned on an opposite end of the core from the U-turn portions. A plurality of insulation tubes are positioned in the plurality of slots. The in-slot portions of the electric conductors extend through the insulation tubes.

20 Claims, 9 Drawing Sheets

(56) References Cited

U.S. PATENT DOCUMENTS

| | | |
|---|---|---|
| 7,348,705 B2 | 3/2008 | Cai et al. |
| 7,649,294 B2 * | 1/2010 | Koike .......................... 310/201 |
| 2008/0007133 A1 * | 1/2008 | Onimaru et al. ............. 310/208 |
| 2010/0173140 A1 * | 7/2010 | Tojo .............................. 428/220 |
| 2010/0244615 A1 * | 9/2010 | Kouda .......................... 310/215 |
| 2011/0095641 A1 * | 4/2011 | Rhoads ........................ 310/215 |

OTHER PUBLICATIONS

USPTO, Appendix I Partial List of Trademarks, A1 -A6, Jul. 2014.*

* cited by examiner

ELECTRIC MACHINE WITH FULLY ENCLOSED IN-SLOT CONDUCTORS

FIELD

This application relates to the field of electric machines, and particularly to electric machine conductors.

BACKGROUND

Segmented windings are commonly used in modern electrical machine applications, such as in hybrid-electric vehicles. These windings typically comprise a plurality of segmented conductors which include in-slot portions and ends that are connected together. The conductors are positioned in the slots of a laminated core portion of the electric machine (e.g. stator slots), and the ends of the conductors are connected to form windings for the electric machine.

Segmented conductors for electric machines are often provided in the form of "U-shaped" conductors which include two legs and a central U-turn portion extending between the legs. These U-shaped conductors may also be referred to herein as "U-shaped bars" or conductors with "U-turn portions". The terms "U-shaped conductor", "U-shaped bar" and "U-turn portion" as used herein refer to electric conductors or conductor portions where the axial direction of the conductor changes by about 180°. However, these terms are not limited to conductors or conductor portions that form a perfect "U" shape.

U-shaped conductors are typically created by bending and twisting wire bars into U-shaped conductors with two legs and a U-turn between the legs. The two legs are separated by a given span which allows the conductor to extend across a number of stator slots by virtue of the U-turn alone. The legs of the conductors are then inserted into the slots of the core from an insertion end of the core. Following insertion of the conductors into the slots of the core, the bend portions (i.e., the U-turn portions) are positioned on one side of the core (i.e., the "insertion side") and the leg ends extend from the other side of the core (i.e., the "connection side" or "weld side"). The legs ends may then be bent to appropriate positions, often with a first leg typically bent in one direction and another leg bent in the opposite direction such that the entire segmented extends a given slot span (e.g., 12 slots). Finally, the tips of the leg ends are connected together at the connection side of the stator to complete the windings. These connections include adjacent leg ends that are directly aligned and joined together (e.g., by welding), non-adjacent leg ends that are connected through jumper wires, and terminal connections. Together, the connected conductors form the complete winding arrangement.

Although the conductors are connected together at their ends, care must be taken to ensure that adjacent conductors do not touch each other and short-circuit the designed winding arrangement. Accordingly, a slot liner comprised of an electrical insulation material is typically provided within the slots of the stator in order to electrically insulate the conductors from the stator core. The conductor itself may also have an insulation coating that covers the conductor within and outward of the stator core.

Care must be taken when the windings are assembled on the stators to avoid electrical shorts between conductors or between a conductor and the lamination steel of the stator core. Electrical shorts between the conductors and the lamination steel often result from manufacturing imperfections in the lamination slot geometry, imperfections in the conductor, and/or inadequate slot liner insulation. In electric motor applications where a U-shaped conductor is used, the slot liner may take the form of an "S", as shown in FIG. 10A. With this arrangement, the conductor is situated in each pocket of the "S" so that each conductor is isolated from the adjacent conductors. However, openings existing between the slot liner and the inner surface of the stator slot. These openings create a potential arc path for a short to occur if the conductor has been damaged or has manufacturing imperfections.

Another slot liner constructions that has been used is a slot liner in the form of a "B", as shown in FIG. 10B. However this form factor requires additional layers of unnecessary slot liner paper to be used (e.g., see double layer 99 in FIG. 10B) to be used between the conductors. This additional liner layer occupies space that could have been used for an increased volume of copper needed for a high slot-fill ratio, which is desired for increased machine performance. It will also be noted that additional layers between conductors are also required with "S" shaped slot liners when four or more conductors are positioned in each slot, and each conductor must be insulated from its adjacent conductors (e.g., see double layer 99 in FIG. 10A).

Accordingly, it would be advantageous to provide an insulation arrangement for electric machines with segmented conductors which provides increased protection from electrical shorts to ground while also providing for a high slot-fill ratio. It would be advantageous if such insulation arrangement could be provided easily and at relatively low cost to the manufacturer.

SUMMARY

In accordance with one embodiment of the disclosure, there is provided an electric machine comprising a core with a plurality of slots. A plurality of electric conductors are positioned in the slots. Each of the plurality of electric conductors includes a U-turn portion extending between two in-slot portions and connection ends extending from the in-slot portions. The connection ends are positioned on an opposite end of the core from the U-turn portions. A plurality of insulation tubes are positioned in the plurality of slots. The in-slot portions of the electric conductors extend through the insulation tubes.

In at least one embodiment, each of the plurality of insulation tubes includes a plurality of channels and only a single in-slot portion of the conductor extends through each of the plurality of channels. Each of the plurality of insulation tubes is void of openings between the in-slot portions of the electric conductors and the core. Each of the plurality of insulation tubes may be comprised of mylar or polyimide film. In at least one embodiment each insulation tube includes an outer layer comprised of a polyimide material and an inner layer comprised of meta-aramid material.

In one embodiment, a method of making an electric machine includes inserting a plurality of insulation tubes into a plurality of slots in a stator core. Next a plurality of electric conductors are inserted into the plurality of insulation tubes in the slots of the stator core such that in-slot portions of the plurality of conductors are positioned in the plurality of slots. Each of the plurality of electric conductors includes a U-turn portion extending between two in-slot portions and connection ends extending from the in-slot portions. The connection ends extend from an opposite end of the stator core from the U-turn portions. The method further includes joining adjacent connection ends of the plurality of electric conductors to form a winding arrangement on the stator core.

In at least one embodiment, an electric machine includes a stator core with a plurality of slots. A plurality of electric conductors are positioned in the slots, each of the plurality of electric conductors including two connection ends and at least one in-slot portion, with the connection ends extending from at least one end of the stator core. A plurality of insulation tubes are positioned in the plurality of slots with the in-slot portions of the electric conductors extending through the insulation tubes. Each of the plurality of insulation tubes includes a plurality of channels with the in-slot portion of one of the plurality of electric conductors extending through each of the plurality of channels. Each of the plurality of channels has a rectangular cross-section and is void of openings from a first end to a second end of the insulation tube.

The above described features and advantages, as well as others, will become more readily apparent to those of ordinary skill in the art by reference to the following detailed description and accompanying drawings. While it would be desirable to provide a conductor insulation system for an electric machine that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
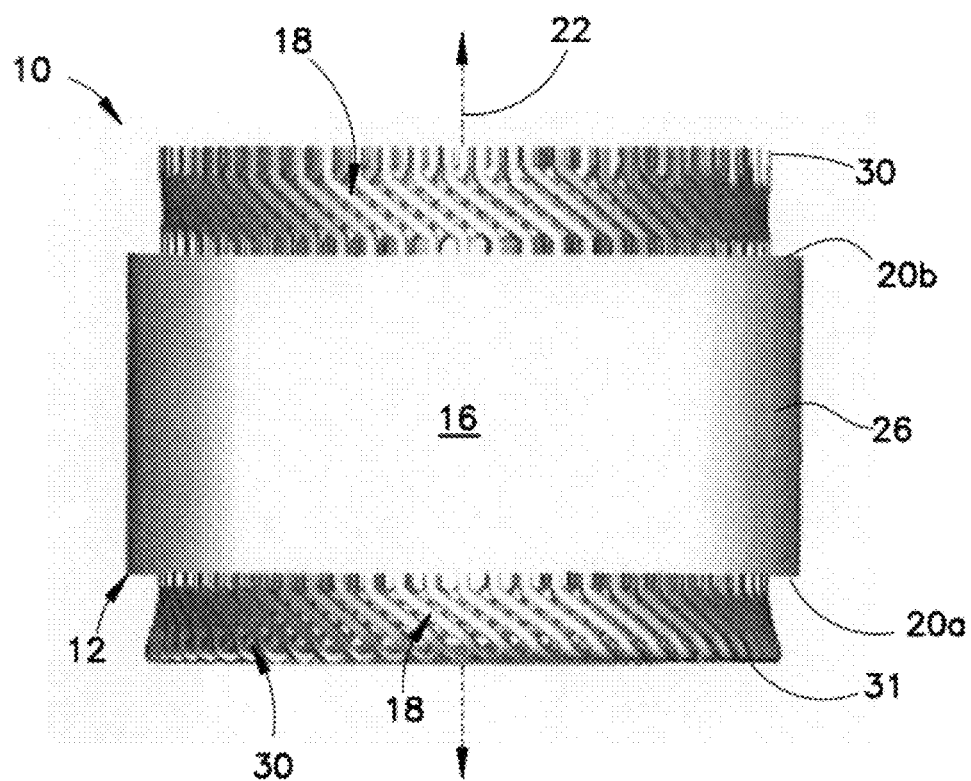
FIG. 1 shows a side view of an embodiment of a core of an electric machine with a winding positioned on the core.
Figure 2:
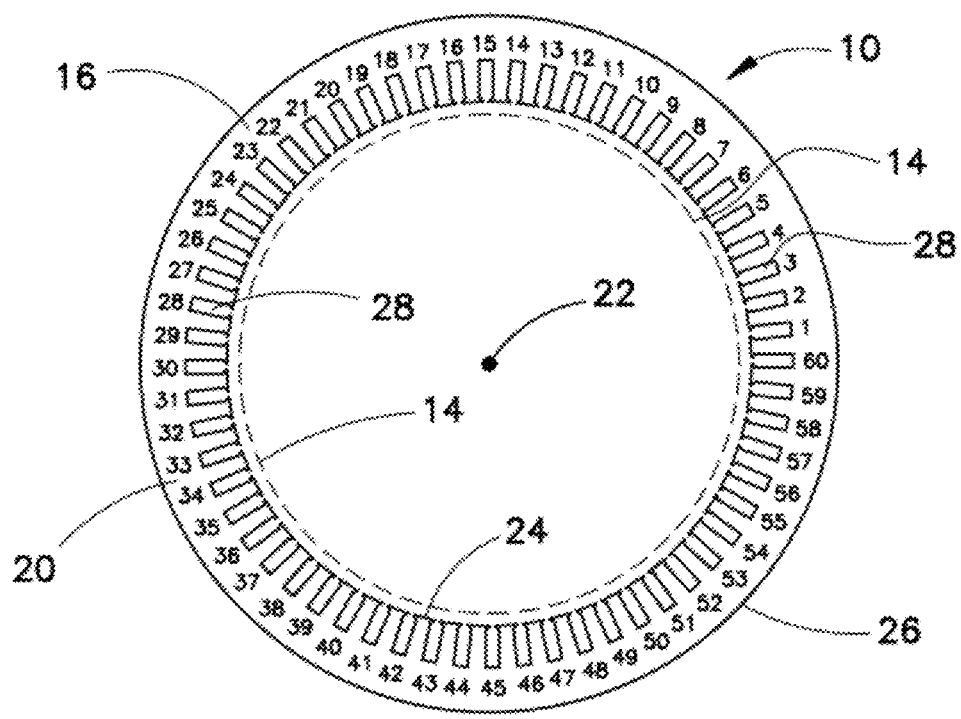
FIG. 2 shows a diagrammatic top view of the core of FIG. 1.

With general reference to FIGS. 1 and 2, an electric machine 10 includes a stator 12 and a rotor 14 (represented in FIG. 2 by dotted lines). The stator 12 includes a core 16 and a winding arrangement 18 positioned on the stator core 16. The stator 12 is magnetically coupled to a rotor through the winding arrangement 18. As explained in further detail below, the winding arrangement 18 is electrically insulated from the core 10 by a plurality of insulation members 40 and 50.

The stator core 16 is comprised of a ferromagnetic material and is typically formed from a plurality of steel sheets that are stamped in the shape of the core 16 and stacked upon one another to form a lamination stack. The stator core 16 (which may also be referred to herein as the "stator lamination" or "lamination stack") is generally cylindrical in shape as defined by a center axis 22, and includes an inner perimeter surface 24 and an outer perimeter surface 26. When the stator core 16 is viewed in an axial direction from an end 20, as shown in FIG. 2, the stator core 16 has a substantially circular or disc shape.

Figure 4:
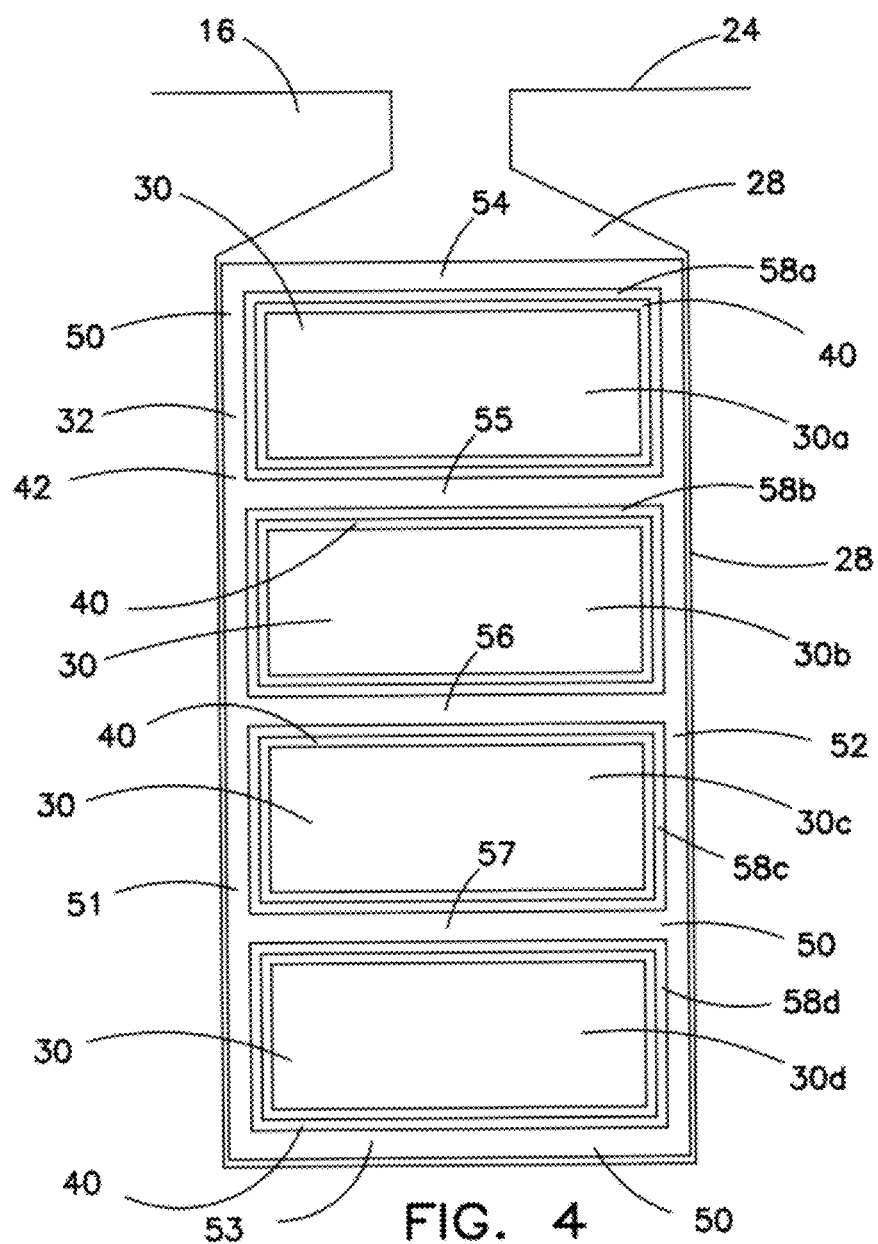
FIG. 4 shows a diagrammatic cross-sectional view of a slot in the core of FIG. 1.

A plurality of axial slots 28 are formed in the stator core 16 between the inner perimeter surface 24 and the outer perimeter surface 26. In the embodiment of FIG. 2, the stator core 16 includes sixty total slots 28 (which are numbered 1-60 in the diagram of FIG. 2). In other embodiments, the stator core 16 may include more slots or fewer slots. The slots 28 may be semi-closed slots in the stator core 16, as shown in FIGS. 2 and 4, such that each slot 28 has a smaller diameter near the inner perimeter surface 24 than the diameter closer to the outer perimeter surface 26. Openings to the semi-closed stator slots 28 are provided through the inner perimeter surface 24 as well as the ends 20 of the stator core 16.

A plurality of segmented conductors 30 are positioned in the slots 28 of the stator 10. When the conductors 30 are connected together they form the winding arrangement 18 on the stator core 16. The conductors are inserted into the stator core 16 from an insertion side 20a (which may also be referred to herein as the "insertion end") of the stator core 16, and the conductors 18 are welded or otherwise joined together at a weld side 20b (which may also be referred to herein as the "weld end") of the stator core 16.

Figure 3:
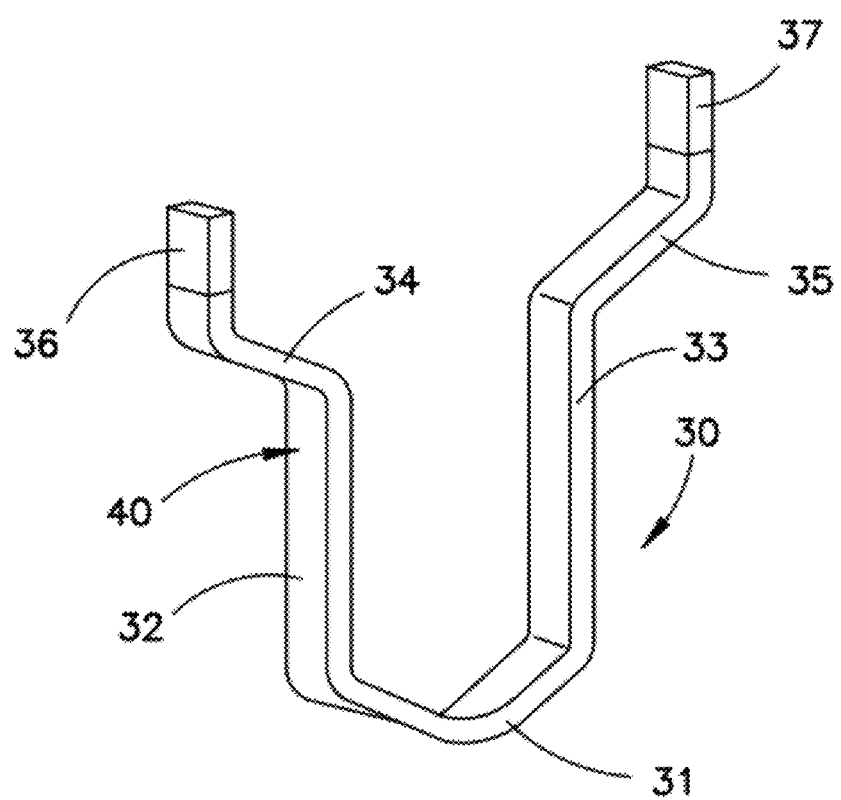
FIG. 3 shows a perspective view of a segmented conductor for the electric machine winding of FIG. 1.

An exemplary U-shaped segmented conductor 30 of rectangular cross-section is shown in FIG. 3. The segmented conductor 18 includes two in-slot portions 32 and 33 connected by a U-turn portion 31. Each in slot portion 32, 33 is joined to an associated connection end 34, 35. Tips 36, 37 are provided on each connection end 34, 35. Each tip 36, 37 is connected to the tip of another conductor such that the conductors together form the winding arrangement 18 on the stator core 16. An exemplary winding arrangement is shown in U.S. Pat. No. 7,622,843, issued Nov. 24, 2009, the contents of which are incorporated herein by reference.

Each conductor 30 is coated with a thin layer of insulating material 40 (as best shown in the cross-sectional view of FIG. 4). The insulating material 40 may be provided by a resin material, such as enamel, that is bonded to the surface of the conductor 30 by any of various methods known in the art. The resin material provides a coating of insulating material 40 covers the entire conductor 30 from one connection end 34 to the other connection end 35. However, the enamel coating 30 does not cover the tips 36, 37 of the conductor 30 in order to facilitate connection of the tips.

Each segmented conductor 30 is generally formed from a straight conductor segment that is bent to the shape shown in FIG. 3 after the conductor is inserted into the slots of the core 16. In particular, before a conductor segment is inserted into the stator slots 28, a machine bends a generally straight conductor segment to create the U-turn portion 31 with the in-slot portions 32, 33 positioned in parallel at opposite sides of the U-turn portion 31. At this time, the connection ends 34, 35 extend straight out from the in-slot portions 33, 34. After the U-turn portion 31 is created, the conductor 30 is inserted into the slots of the stator core 16. The connection ends 34, 45 are first inserted into the slots 28 from the insertion side 20a (see FIG. 1) of the stator core 16, with the in-slot portions 32, 33 following the connection ends 34, 35 through the slots 28. Once placed in the stator core 16, the in-slot portions 32, 33 of a given conductor 30 are positioned in different slots 16 of the stator. The connection ends 34, 35 extend from the weld side 20b (see FIG. 1) of the stator, opposite the U-turn portions 31 which extend from the insertion side 20a. After being inserted in the stator, the connection ends 34, 35 are bent by a machine in opposite directions by a predetermined distance. Thereafter, the tip 36, 37 of each connection end 34, 35 of a conductor 30 is directly connected to an adjacent tip 36, 37 on another conductor 30. The connection of the tips 36, 37 may be accomplished in any number of ways such as welding, brazing, or other methods known in the art. By connecting the segmented conductors in this fashion, complete windings 18 are formed on the stator core 16. Although the conductor segments 30 have been described herein as being generally U-shaped and connected at one end 20b of the stator core 16, it will be recognized that in other embodiments the conductor segments may be provided in different forms, including conductor segments with only a single in-slot portion and two connection ends that are connected at opposite sides of the stator core 16. Moreover, in a single embodiment, U-shaped conductors may be utilized along with non-U-shaped conductor segments to complete the winding arrangement.

With particular reference to FIG. 4, an enlarged cross-sectional view of one of the slots 28 of the stator core 16 is shown with the segmented conductors 30 placed in the stator 12. In the exemplary embodiment of FIG. 4, the segmented conductors 30 have a rectangular cross-section and four conductors 30a-30d are placed in each slot 28. In other embodiments, the conductors 30 may have a different shape and more or less conductors may be placed in each slot 28. Each conductor 30 is separated from neighboring conductors in the slot 16 by at least one insulation layer, as described in further detail below.

With continued reference to FIG. 4, each conductor 30 in a slot 28 is separated from adjacent conductors 30 and the stator core 16 by at least one layer of insulation material within the slot 28. In some embodiments, including the embodiment of FIG. 4, each conductor 30 is separated from adjacent conductors by at least two layers of insulation material within the slot. The first layer of insulation material may be provided by the enamel or other insulative coating 40 that is bonded to the surface of the conductors 30, as described above. The second layer of insulation material may be provided by a slot liner 42 that is positioned within the slot.

Figure 5:
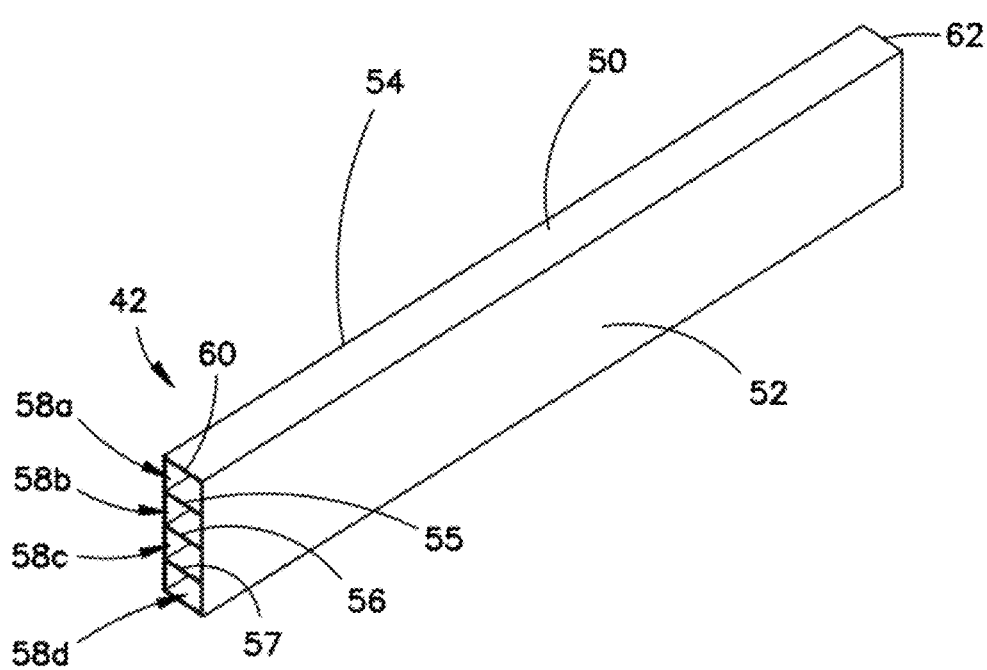
FIG. 5 shows a perspective view of a insulation tube for the electric machine of FIG. 1.

With reference now to FIGS. 4 and 5, a slot liner 42 is shown in the form of an insulation tube 50. The insulation tube 50 provides the second insulation layer for the conductors 30 in the slot 28. The insulation tube 50 has a generally block shape with a rectangular cross-sectional perimeter. The insulation tube 50 includes two circumferential perimeter walls 51, 52 and two radial outer walls 53, 54. In the embodiment of FIGS. 4 and 5, the insulation tube 50 also includes a plurality of inner walls 55, 56 and 57. Together, the circumferential perimeter walls 51, 52, radial outer walls 53, 54, and inner walls 55, 56 and 57 provide four elongated channels 58a-58d within the insulation tube 50. Each elongated channel 58a-58d extends from one end 60 to an opposite end 62 of the tube. Openings to the channels 58a-58d are provided at both the first end 60 of the insulation tube 50 and the opposite end 62 of the tube. No openings are provided along the length of the tube 50 between ends 60 and 62. Accordingly, walls 51-54 are complete and void of openings. Additionally, walls 55-57 between the channels 58a-58d are also complete and void of openings.

The insulation tube 50 is situated in the slot 28 such that the walls 51-57 extend in the axial direction (i.e., in the direction of axis 22 shown in FIG. 2) along the entire length of the slot 28 (i.e., from the insertion end 20a to the weld end 20b of the stator core 16). Each of the plurality of insulation tubes may extend slightly out of the associated slot in the axial direction. For example, each insulation tube 50 may extend a length out of the slot that is less than 10% of the total length of the insulation tube. Each conductor 30a-30d in the slot 28 extends through one of the channels 58a-58d of the insulation tube 50. Accordingly, the insulation tube 50 insulates the conductors 30a-30d from contact with the stator core 16 within the slot 28. Additionally, because the insulation tube 50 encompasses all axial sides/edges of the conductors within in the slot 28 in the embodiment of FIGS. 4 and 5, the insulation tube 50 also insulates the individual conductors 30a-30d from each other.

Figure 10A:
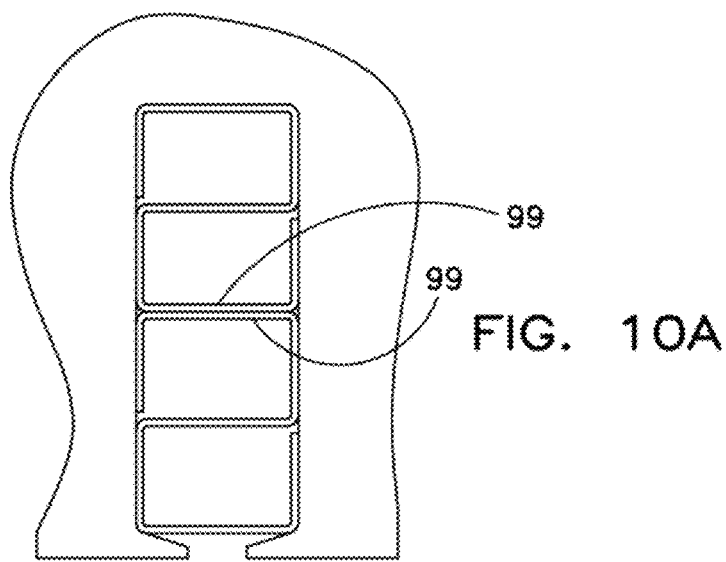
FIG. 10A shows a cross-sectional view of a slot with an "S" shaped slot liner positioned therein.
Figure 10B:
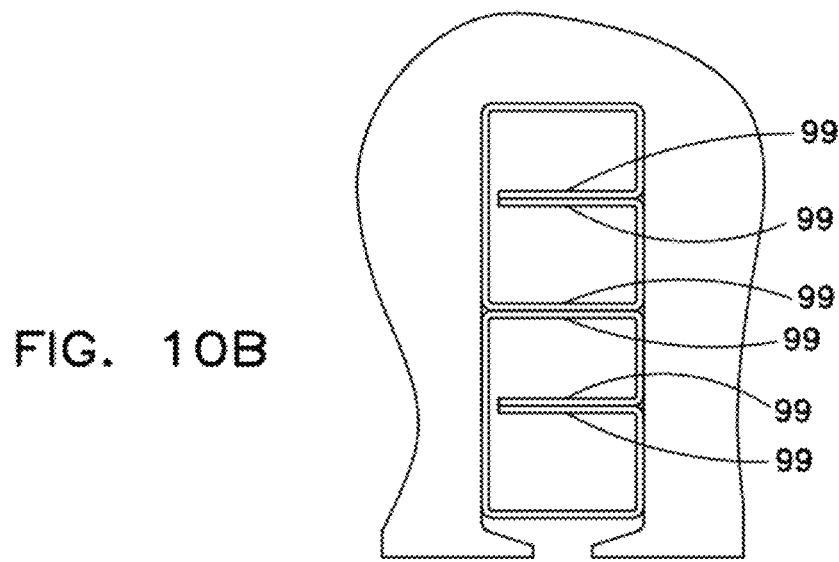
FIG. 10B shows a cross-sectional view of a slot with "B" shaped slot liner positioned therein.

As noted above, with the tubular type construction of the slot liner 42, the multiple conductors 30a-30d in the slot are 100% isolated from the walls of the slot 28 on all sides, as there are no openings in the walls 51-57, as is typical with some prior art slot liners (see FIG. 10A). Moreover, there is no overlap of insulation material in the slot liner 42 as is typical with may prior art slot liners (see 99 in FIGS. 10A and 10B), and no excess material is required. This allows for the maximized form factor/slot fill to be achieved, all while isolating the conductor within the slot.

Figure 6:
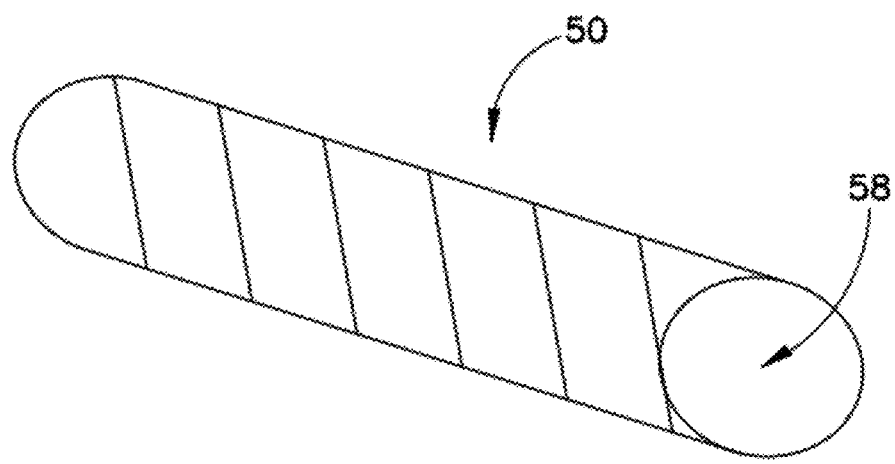
FIG. 6 shows a diagram illustrating of a spiral wound embodiment of the insulation tube of FIG. 5.

While the insulation tube 50 in the embodiment of FIGS. 4 and 5 shows four channels, it will be appreciated that the slot liner may include more or less channels, such as six channels, two channels, or only a single channel. Additionally, the insulation tube 50 can be constructed in a variety of manners. For example, the insulation tube 50 may be formed from an extrusion molding process to provide a uniform integral piece. As another example, the insulation tube 50 may be formed by wrapping a sheet of insulative material for the slot liner 42 in a helix to form the tube 50, as illustrated in FIG. 6. The helix wrap embodiment typically includes an overlap between respective layers to build the proper wall thickness for the desired dielectric strength for the application. Various adhesives and filler papers can be used to help secure edges of the sheet to itself to form the tube or to help secure adjacent tubes to form a complete tube. Adhesives and filler papers may also be used to provide an avenue for varnish to wick into the tube during a varnishing step (such as a trickle, dip, vacuum impregnation or other comparable process).

Figure 7:
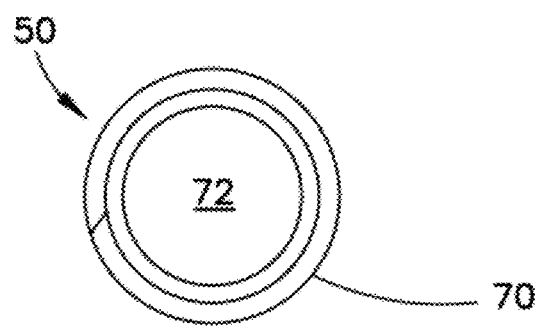
FIG. 7. shows a cross-sectional view of the insulation tube of FIG. 6.

Exemplary materials that can be used for the construction of the insulation tube 50 include those materials with high dielectric strengths, such as mylar and polyimide films. When thin filmed, high dielectric materials are used, the thermal transfer from the conductor 30 to the lamination stack 16 can be improved. Additionally, filler paper materials such as meta-aramid materials and the like can be used in combination with the high dielectric materials. These materials can help provide a means for varnish adhesion between the conductor 30 and slot liner 42, or the slot liner 42 and the stator lamination 16. These materials can be either placed on the inside, outside, or both surfaces of the high dielectric material. For example, FIG. 7 shows a cross-sectional view of a spiral wound tubular slot liner 42 with an outer layer 70 comprised of a polyamide material and an inner layer 72 comprised of meta-aramid material. The filler paper materials 72 can help add mechanical column strength to the insulation tube 50 to help prevent buckling of the liner during handling or insertion of the conductors 30 into the stator slots 28 and the channels of the insulation tube 50.

The tubular slot liners 42 disclosed herein are particularly adapted for use in automotive vehicle applications, including electric drive motors for hybrid electric vehicles. In such electric drive motors, the dimensions of the rectangular slot liner of FIG. 4 may be about 5.15 mm×14.3 mm, with each channel 58 about 4.60 mm×3.26 mm. This dimension allows the slot liner 42 to fit within a slot of a stator core configured to receive four conductors each with a rectangular cross-section of about 4.5 mm×3.1 mm.

While the insulation tube 50 has been described with one exemplary embodiment in FIGS. 4 and 5, it will be appreciated that in other embodiments the insulation tube may be provided in different forms. For example, although the insulation tube 50 has a rectangular cross-section in the embodiment of FIGS. 4 and 5, the insulation tube 50 has a circular cross-section in the embodiment of FIGS. 6 and 7. In other embodiments, the insulation tube may have other cross-sectional shapes, such as a square or oval cross-section. Additionally, although the tubular slot liner 42 includes multiple channels (i.e., four channels 58a-d) in the embodiment of FIGS. 4 and 5, the tubular slot liner 42 includes only one channel in the embodiment of FIGS. 6 and 7. Accordingly, in different embodiments, the tubular slot liners 42 may include different numbers of channels.

Figure 8A:
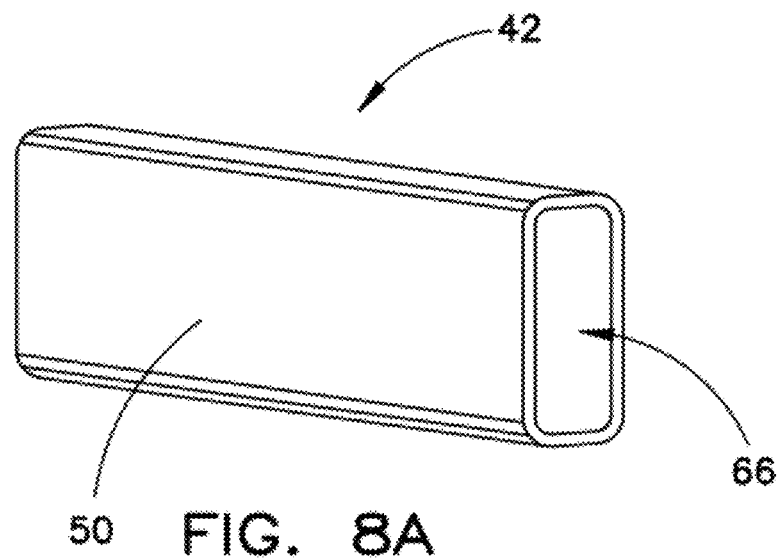
FIG. 8A shows a perspective view of another embodiment of the insulation tube of FIG. 5.
Figure 8B:
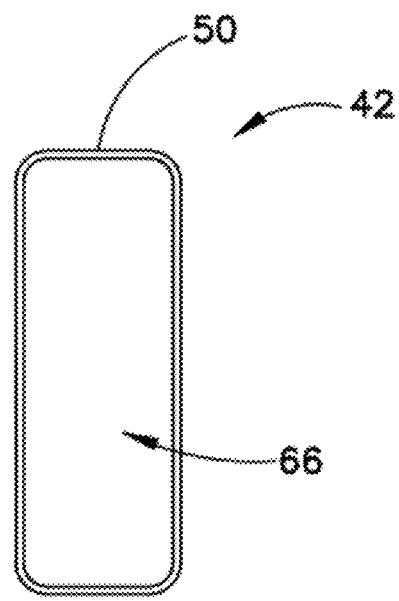
FIG. 8B shows a cross-sectional view of the insulation tube of FIG. 8A.
Figure 9:
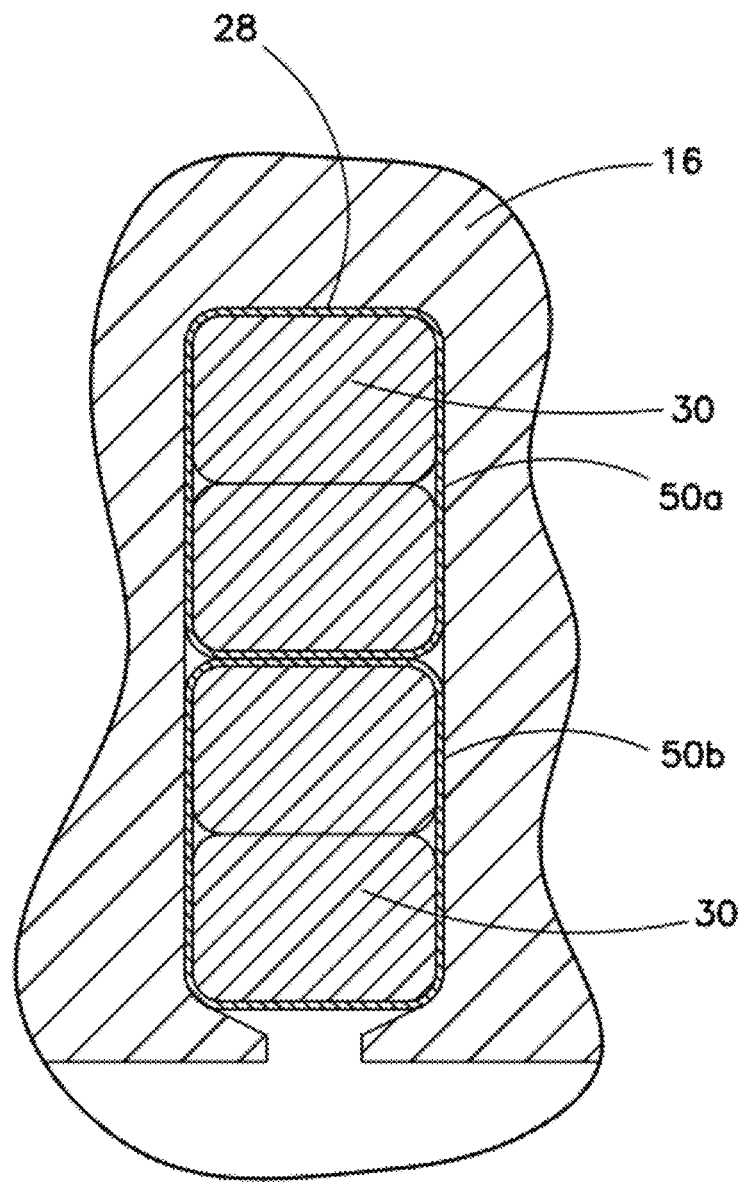
FIG. 9 shows a cross-sectional view of a slot with another embodiment of the insulation tube of FIG. 5 positioned in the slot.

Different embodiments of the slot liner utilized in an electric machine 10 may depend at least in part on the particular winding arrangement used, including the positions of the various conductors 30 within the slots 28 and the respective phase that they represent in a multi-phase machine. For example, in the embodiment of FIGS. 8A and 8B, the tubular slot liner 42 includes only a single channel 66 and all conductors in the slot may be positioned in the single channel 66 and associated with a single phase in the multi-phase machine. However, in the embodiment of FIG. 9, the two single channel tubular slot liners 50a and 50b are used in a single slot 28 to isolate two different groups of multiple conductors, where each group of conductors is associated with a different phase in the multi-phase machine. Alternatively, the dual slot liners 50 in the embodiment of FIG. 9 may be substituted for a slot liner that resembles the embodiment of FIGS. 4 and 5, but includes only two channels instead of four channels 58.

A method of assembling a stator for an electric machine is now described using the tubular slot liner described above. The method comprises inserting a plurality of insulation tubes 50 into a plurality of slots 28 in a stator core 16. Next, a plurality of electric conductors 30 are inserted into the plurality of insulation tubes 50 in the slots 28 of the stator core 16 such that in-slot portions 32, 33 of the plurality of conductors 30 are positioned in the plurality of slots 28. Each of the plurality of electric conductors 30 further includes a U-turn portion 31 extending between two in-slot portions 32, 33 and connection ends 34, 35 extending from the in-slot portions 32, 33. The connection ends 34, 45 extend from an opposite end of the stator core 16 from the U-turn portion 31. The method further includes joining adjacent connection ends 32, 33 of the plurality of electric conductors to form a winding arrangement on the stator core 16.

In at least one embodiment of the disclosed method, each of the plurality of insulation tubes includes a plurality of channels, and the plurality of conductors are inserted into the plurality of insulation tubes. In at least one embodiment of the method a single conductor is inserted into each of the plurality of channels. In another embodiment, at least two conductors are inserted into each of the plurality of channels.

The foregoing detailed description of one or more embodiments of the conductor insulation arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An electric machine comprising:
   a core with a plurality of slots;
   a plurality of electric conductors positioned in the slots, each of the plurality of electric conductors including a U-turn portion extending between two in-slot portions and connection ends extending from the in-slot portions, the connection ends extending from an opposite end of the core from the U-turn portion, each of the plurality of electric conductors including a resin material providing an electrically insulating coating over the entire conductor extending along the U-turn portion and the in-slot portions but not included on tips of the connection ends, the plurality of electric conductors forming a multi-phase winding on the core;
   a plurality of insulation tubes positioned in each of the plurality of slots, each of the plurality of insulation tubes defining a single channel, the in-slot portions of the electric conductors extending through the insulation tubes with at least two in-slot portions of the plurality of electric conductors extending through each insulation tube, wherein each insulation tube in each slot separates a first group of electric conductors from a second group of electric conductors in the slot, the first group of electric conductors associated with a different phase of the multi-phase winding from the second group of electric conductors; and
   an inner layer lining the single channel of each insulation tube such that the inner layer is positioned in between the insulation tube and the at least two in-slot portions extending through the insulation tube, each inner layer comprised of a filler paper material, and each inner layer in contact with the at least two in-slot portions of the plurality of electric conductors extending through the insulation tube.

2. The electric machine of claim 1 wherein each of the plurality of insulation tubes is void of openings between the in-slot portions of the electric conductors and the core.

3. The electric machine of claim 1 wherein each of the plurality of insulation tubes is comprised of a polyester film, and each of the inner layers comprised of a meta-aramid material.

4. The electric machine of claim 1 wherein each of the plurality of insulation tubes have a substantially rectangular cross-section.

5. The electric machine of claim 1 wherein each of the plurality of insulation tubes is configured as an elongated sheet of insulation material wrapped into a helix around the in-slot portions of the electric conductors.

6. The electric machine of claim 1 wherein each of the insulation tubes is uniform in cross-section and void of openings from a first end to a second end of the tube.

7. The electric machine of claim 1 wherein each of the plurality of insulation tubes extends from one of the plurality of slots and less than 10% of a length of the insulation tube extends from an end of the slot.

8. A method of making an electric machine comprising:
   forming a plurality of slot structures including a plurality of insulation tubes, each of the plurality of insulation tubes including an outer layer defining a single channel and an inner layer lining the channel, the inner layer comprised of a filler paper material mechanically strengthening the outer layer of the insulation tube, each of the plurality of insulation tubes separated from other of the plurality of insulation tubes;

inserting the plurality of slot structures into a plurality of slots in a stator core such that each slot of the stator core retains multiple insulation tubes;

inserting a plurality of electric conductors into the plurality of slot structures in the slots of the stator core such that at least two in-slot portions of the plurality of conductors are positioned in each of the insulation tubes and the inner layers of the slot structures are positioned between the outer layers of the insulation tubes and the electric conductors with the inner layers in contact with the plurality of electric conductors, each of the plurality of electric conductors including a U-turn portion extending between two in-slot portions and connection ends extending from the in-slot portions, the connection ends extending from an opposite end of the stator core from the U-turn portion, each of the plurality of electric conductors coated with an electrically insulating layer comprised of a resin material, the electrically insulating layer extending over the entire conductor in the in-slot portions and the U-turn portions but not extending to tips of the connection ends; and joining adjacent connection ends of the plurality of electric conductors.

9. The method of claim 8 further comprising forming the plurality of insulation tubes with or polyimide film and forming the inner layer with a meta-aramid material.

10. The method of claim 8 wherein joining adjacent connection ends of the plurality of electric conductors results in a multi-phase winding, wherein each insulation tube in each slot separates a first group of electric conductors from a second group of electric conductors in the slot, the first group of electric conductors associated with a different phase of the multi-phase winding from the second group of electric conductors.

11. The method of claim 10 wherein four electric conductors are positioned in a row in each slot, and two insulation tubes are positioned in each slot with a first pair of electric conductors in one insulation tube and a second pair of electric conductors in a second insulation tube.

12. An electric machine comprising:
a core with a plurality of slots;
a plurality of electric conductors positioned in the slots, each of the plurality of electric conductors including a U-turn portion extending between two in-slot portions and connection ends extending from the in-slot portions, the connection ends extending from an opposite end of the core from the U-turn portion, each of the plurality of electric conductors coated with a resin material that provides an electrically insulating layer along the entire outer surface of the conductor extending along the U-turn portion and the in-slot portions but not included on tips of the connection ends; and a plurality of separate insulation tubes positioned in each of the plurality of slots, each of the plurality of insulation tubes in contact with an adjacent insulation tube in one of the plurality of slots, each of the plurality of insulation tubes including an outer layer and an inner layer with a single channel defined by the insulation tube, each in-slot portion of the plurality electric conductors extending through one of the insulation tubes with at least two in-slot portions extending through a single channel, each inner layer positioned between the outer layer of the insulation tube and the electric conductor extending through the insulation tube, each inner layer comprised of a filler paper material surrounding and contacting the electric conductor extending through the insulation tube and separating the electric conductor from the outer layer of the insulation tube.

13. The electric machine of claim 12 wherein each of the plurality of insulation tubes is void of openings between the in-slot portions of the electric conductors and the core.

14. The electric machine of claim 12 wherein each of the plurality of insulation tubes is comprised of polyimide film, and each of the inner layers comprised of a meta- material.

15. The electric machine of claim 12 wherein each of the plurality of insulation tubes have a substantially rectangular cross-section.

16. The electric machine of claim 12 wherein each of the plurality of insulation tubes is configured as an elongated sheet of insulation material that spiral wraps around the in-slot portions.

17. The electric machine of claim 12 wherein each of the insulation tubes is uniform in cross-section and void of openings from a first end to a second end of the tube.

18. The electric machine of claim 12 wherein each of the plurality of insulation tubes extends from one of the plurality of slots and less than 10% of a length of the insulation tube extends from an end of the slot.

19. The electric machine of claim 12 further comprising a multi-phase winding including the plurality of electric conductors, wherein each insulation tube in each slot separates two different groups of conductors in the slot, each group of conductors associated with a different phase of the multi-phase winding.

20. The electric machine of claim 19 wherein four electric conductors are positioned in a row in each slot, and two insulation tubes are positioned in each slot with a first pair of electric conductors in one insulation tube and a second pair of electric conductors in a second insulation tube.

* * * * *